(No Model.)  3 Sheets—Sheet 1.
G. R. SHERWOOD.
MACHINE FOR REMOVING PITH FROM STALKS.
No. 601,592. Patented Mar. 29, 1898.
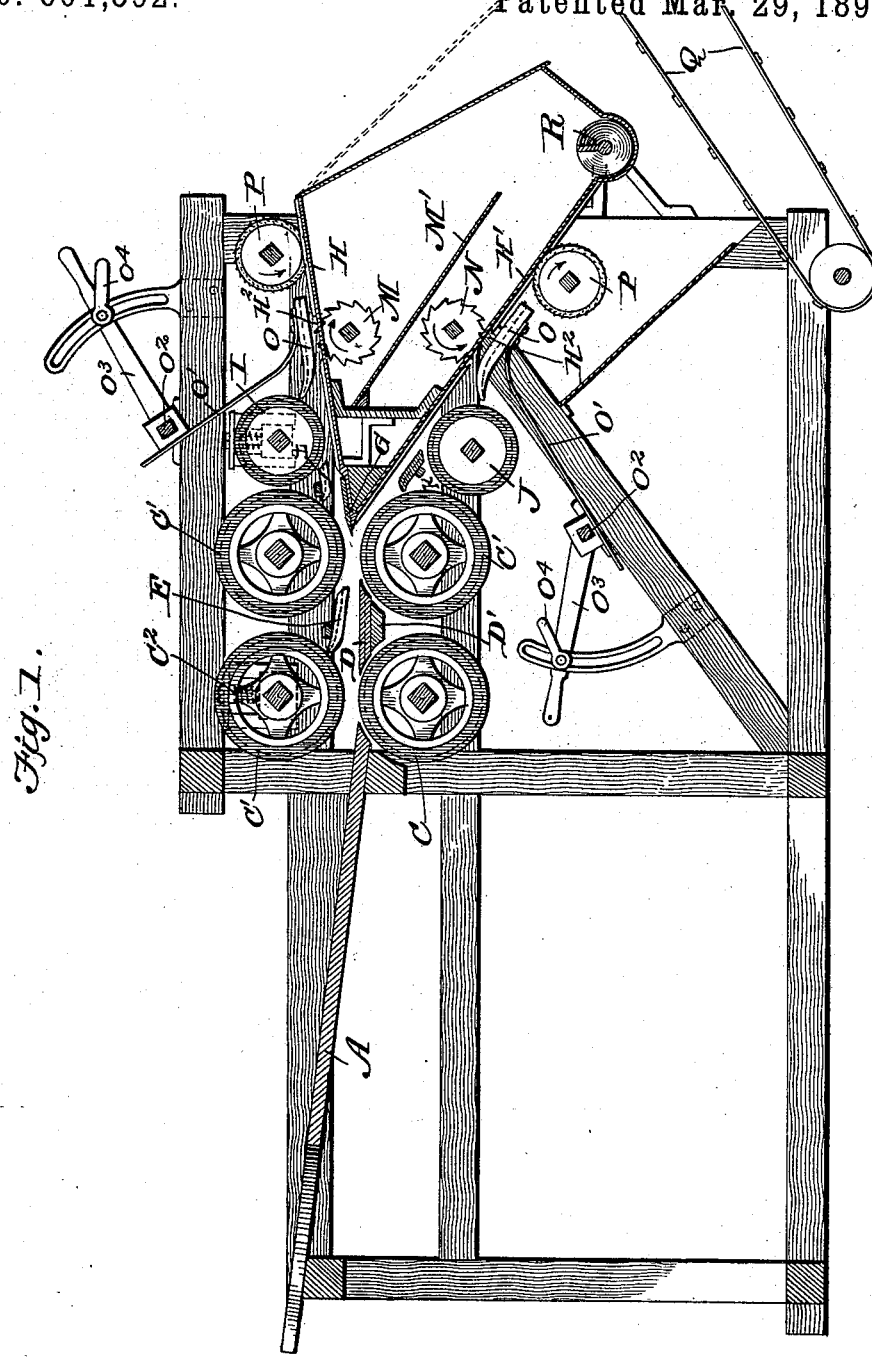
WITNESSES:
INVENTOR
George R. Sherwood.
BY
ATTORNEYS.

(No Model.) 3 Sheets—Sheet 2.
G. R. SHERWOOD.
MACHINE FOR REMOVING PITH FROM STALKS.
No. 601,592. Patented Mar. 29, 1898.
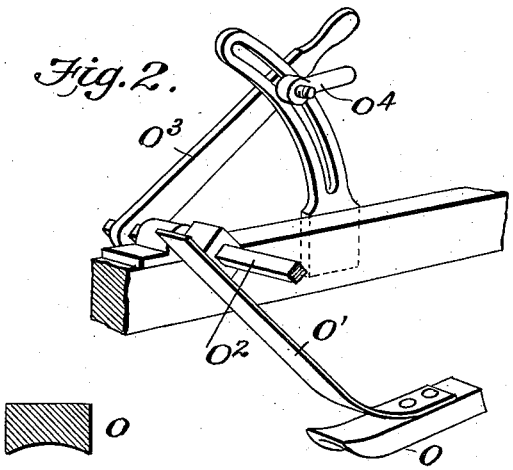
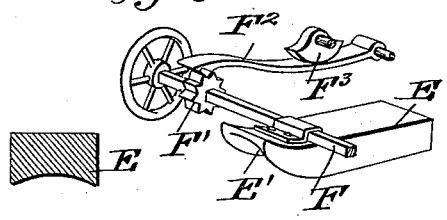
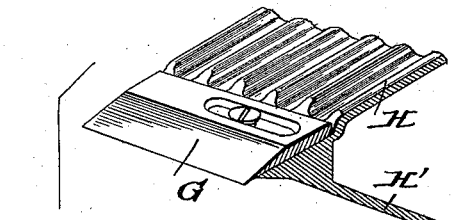
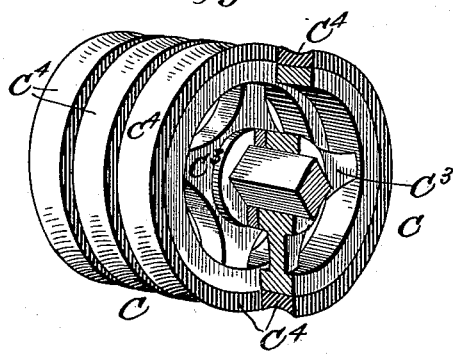
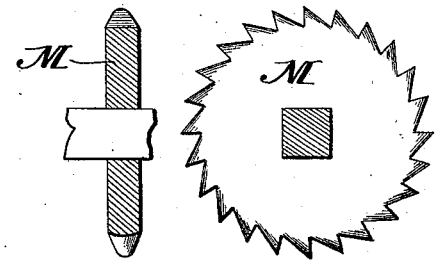
WITNESSES:
M. D. Blondel
P. B. Turpin
INVENTOR
George R. Sherwood.
BY Munn & Co.
ATTORNEYS.

(No Model.) 3 Sheets—Sheet 3.
G. R. SHERWOOD.
MACHINE FOR REMOVING PITH FROM STALKS.
No. 601,592. Patented Mar. 29, 1898.
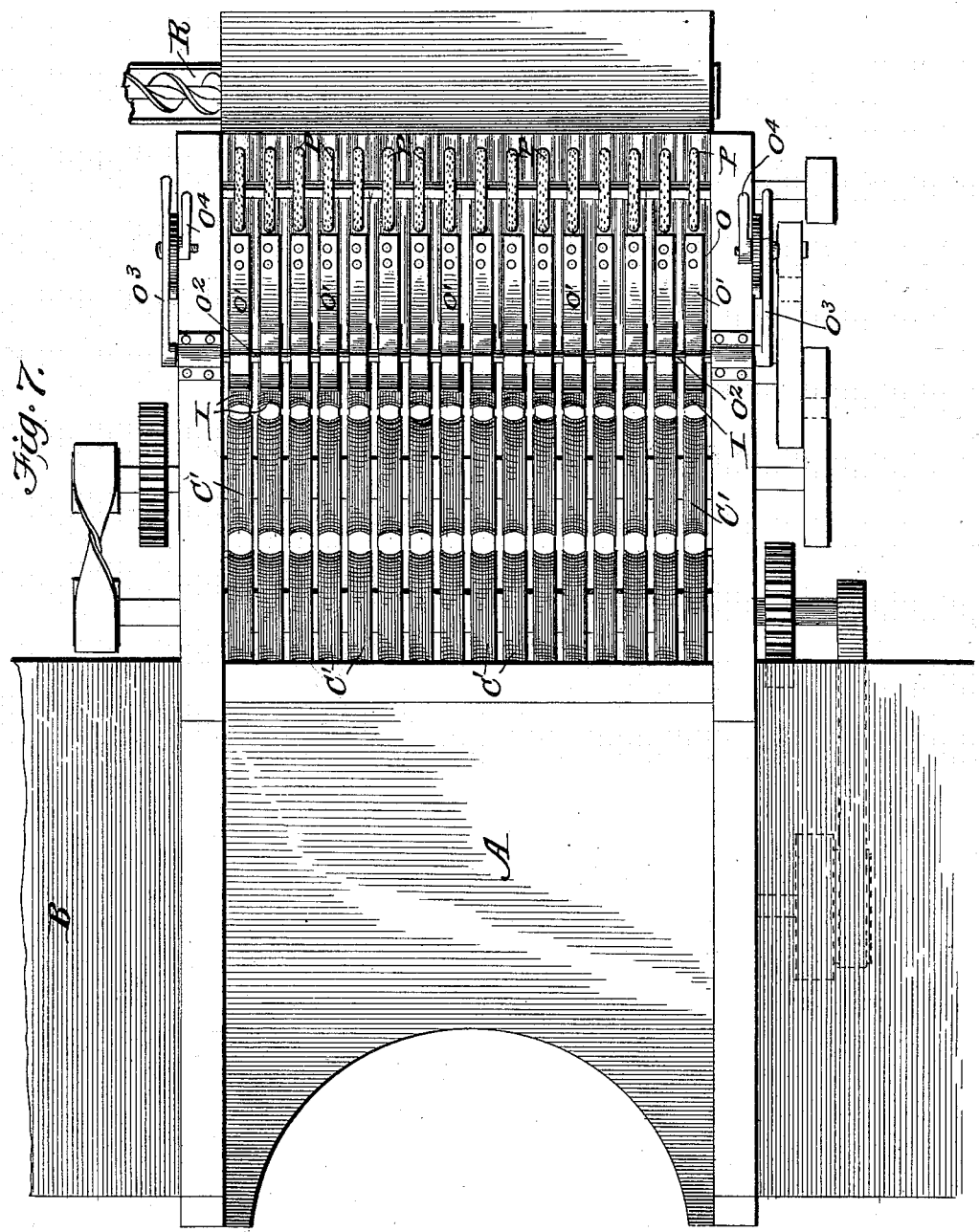
WITNESSES:
M. D. Blondel
P. B. Turpin
INVENTOR
George R. Sherwood.
BY Munn & Co.
ATTORNEYS.

UNITED STATES PATENT OFFICE.

GEORGE R. SHERWOOD, OF KEARNEY, NEBRASKA.

MACHINE FOR REMOVING PITH FROM STALKS.

SPECIFICATION forming part of Letters Patent No. 601,592, dated March 29, 1898.

Application filed October 11, 1897. Serial No. 654,805. (No model.)

*To all whom it may concern:*

Be it known that I, GEORGE R. SHERWOOD, residing at Kearney, in the county of Buffalo and State of Nebraska, have invented a new and useful Improvement in Machines for Removing Pith from Stalks, of which the following is a specification.

My invention is an improvement in machines for removing pith from stalks, and has for an object to provide simple means by which to direct the stalks properly to the removing devices and for removing the pith; and the invention consists in certain novel constructions and combinations of parts, as will be hereinafter described, and pointed out in the claims.

In the drawings, Figure 1 is a vertical longitudinal section of my machine. Fig. 2 is a detail perspective view of one of the pressure-plates. Fig. 3 is a detail view of one of the tilting shoes. Fig. 4 is a detail view showing a portion of the knife and of the diverging guide-plates leading therefrom. Fig. 5 is a detail perspective view showing several of the feeding-wheels. Fig. 6 is a detail view of one of the pith-removing wheels. Fig. 7 is a top plan view.

In carrying out my invention I provide a suitable framing having at one end a feed-table A, inclining downward toward the inlet of the machine, and, where desired, inclined platforms B may be arranged on opposite sides of and lead down to the table A to supply the stalks thereto, as desired.
From the table A the stalks are fed between the gangs of feed rolls or wheels C and C', which are suitably driven and are constructed alike and similarly supported, except that the upper rollers have their shaft supported in yielding bearings $C^2$ to avoid crushing the stalks and to properly accommodate stalks of different sizes. These feed-rolls are each formed with a body portion $C^3$, of wood or metal, and a rim or tire $C^4$, which is preferably of rubber and is grooved to receive a stalk fed from the inclined table A. I prefer to provide two sets of rollers C and C', one set being arranged in rear of the other, and between them, about in line with the tops of the lower rolls, I arrange a corrugated supporting-plate D, which may be braced by a cleat D' beneath it and is set with its corrugations or grooves in line with the grooves in the rolls C to properly guide the stalk passing between such rolls. Above the corrugated plate D, I provide the tilting grooved shoes E, which are supported on a journaled cross-bar F, which is supplied with a pinion F', which may be locked by a pawl $F^2$ and a cam $F^3$ in any desired adjustment. These shoes E have their front ends sloped or inclined at E' and are grooved in their under sides in line with their respective grooves in the feed-rolls and the plate D. These rolls C C' and the corrugated plate D and shoes E tend to aline the stalks and direct the same properly to the splitting-knife G, which is arranged in a line between the rear gangs of feed-rolls C C'. This knife G is horizontally disposed and may be made adjustable longitudinally to bring fresh cutting-surfaces into play when the knife is dull. The purpose of this knife G is to split the stalks longitudinally into halves, and the halves so formed are directed along the diverging guide-plates H H', leading rearwardly from the knife. These plates H and H' are corrugated, corresponding to the feed rolls and plates before described, and direct, together with rolls I and J and intermediate corrugated plates K and L, the stalks to the pith-removing wheels M and N. These wheels M and N are located between the diverging plates and are driven in the direction indicated. It will be noticed that the plates H and H' are slotted at $H^2$ and the wheels M and N play through such slots to properly contact with the stalks. I form the wheels M and N with their rim portions curved in cross-section to conform to and fit in the hollow of the stalks in order to properly remove the pith, and the rims of the wheels are suitably toothed, as shown in the detail figure, to more effectually strip the pith from the stalks. In order to hold the stalks properly to the wheels M and N, I provide pressure-plates O, one for each of the wheels M and N, and support pressure-plates O on springs O', extending from the shaft $O^2$, which is suitably journaled and has a projecting handle $O^3$ and detent $O^4$, by which the tension of the pressure-plates may be adjusted. These pressure-plates are grooved to properly receive the stalks and are tapered at their front ends to properly receive such stalks, as will be understood from Fig. 1.

It will be seen that the direction of rotation of the pith-removing wheels M and N corresponds with the movement of the stalk, which is preferred, because it avoids the cutting out by such wheels of the solid wooden portion at the end of each section of the stalk, which would occur if the cutters operated against the direction of motion of the stalks. In this connection it should be noted that the wheels M and N are operated at a much faster speed than that given to the stalks in their passage through the machine. In rear of the wheels M and N, I provide offtake-wheel P, which discharges the upper stripped stalks out of the machine, the stalks stripped by the lower wheel N dropping by gravity onto a belt Q, by which they may be carried to any desired point. The pith removed by the wheel M drops onto a partition M' and is discharged thence to a screw conveyer R, which also receives the pith removed by the lower wheel N, such conveyer discharging the pith at one side of the machine.

In the operation of my invention the several rollers C, C', I, and J and the wheels M and N and P may be suitably geared together and to a suitable drive-power to secure the desired motion of such parts.

In the operation of my machine the stalks being fed to the feed-rollers are properly directed to the splitting-knife, divided thereby into halves, and the pith thoroughly removed from such halves ready for any use for which it may be desired.

By my invention I not only remove the pith and thereby furnish a product of great value for many purposes and in various arts, but I also provide a valuable food product—to wit, the stalk free of pith—which contains all the valuable food properties of the cane and may be fed directly to stock. It should be understood that the cane with the pith intact is not valuable as a food product, except for a short distance from its tip or small end, where the pith is inconsiderable. The reason why the stalks with the pith in place are not valuable is that the pith absorbs all the digestive and other juices in the mouths and stomachs of the animals, robbing the food substance of such juices, thus preventing the digestion of the cane portions which are valuable for their food properties.

It should be understood that the cane as it is discharged from the machine freed of pith may be fed to the stock without stripping.

Having thus described my invention, what I claim, and desire to secure by Letters Patent, is—

1. A machine for removing pith from stalks comprising feed devices, a splitting-knife, pith-removing devices and diverging guides extending from the knife on opposite sides of and beyond the pith-removing devices substantially as described.

2. A machine for removing pith from stalks comprising a splitting-knife and a wheel for stripping the pith from the stalk split by such knife, such wheel having its edge curved transversely to conform to the hollow of the stalk-section, substantially as described.

3. A machine for removing pith from stalks comprising stalk-feeding devices adapted to feed the stalks separately or individually, corrugated guide-plates by which the stalk is properly directed to the operating parts, means for splitting the stalk guides for directing the stalk-sections individually to the pith-removing devices, and pith-removing devices, substantially as described.

4. A machine substantially as described, comprising the series of individual feed-rolls, whereby the stalks are fed separately to the splitting devices the tilting grooved shoes receiving the stalks from said rolls, the splitting devices and the pith-removing devices, substantially as shown and described.

5. A machine substantially as described comprising the infeed-rolls, the corrugated plates and opposite tilting shoes receiving the stalk from the infeed-rolls, the splitting-knife, the diverging corrugated guide-plates leading from said knife and the pith-removing wheels operating in the grooves of said plates, substantially as described.

6. In a machine substantially as described, the combination of the splitting-knife, the stalk-guide having grooves by which the split stalks are properly directed to the pith-removing wheels, and pith-removing wheels operating in line with the grooves in the guide, substantially as described.

7. A machine for removing pith from stalks comprising devices for splitting the stalks longitudinally into sections and a pith-removing wheel conformed to and fitted to operate in the hollow of the stalk-sections substantially as described.

8. A machine for removing pith from stalks, comprising devices for splitting the stalk longitudinally into sections, a series of infeed-rolls having rims of rubber grooved whereby to feed the stalks separately and individually to the splitting devices and means for removing the pith from the stalk-sections substantially as described.

9. The combination in a machine substantially as described, of the pith-removing wheel, means for directing the stalk to said wheel and a yielding pressure-plate arranged opposite said wheel and grooved to receive the stalk substantially as described.

10. A machine substantially as described comprising means for splitting the stalks, a series of wheels for removing the pith from the split stalk, means for directing the stalks to said wheels, pressure-plates coöperating with said wheel, spring-plates supporting said pressure-plates, a shaft carrying the said spring-plates and means for adjusting said shaft, substantially as described.

11. A machine for removing pith from stalks comprising infeed-rolls grooved to receive the stalks, grooved guide-plates between said rolls, the splitting-knife, the corrugated diverging guide-plates leading from said knife, the pith-removing wheels and the spring-pressure plates coöperating with said wheels, substantially as described.

12. A machine substantially as described comprising the splitting devices, the diverging guides leading therefrom, the pressure-rollers by which the split-stalk sections are held in contact with the guide-plates and devices for removing the pith from the stalk-sections substantially as described.

13. The combination with a suitable frame, of feeding-rolls mounted therein, a splitting-knife in rear of said rolls, pith-removing wheels in rear of the splitting-knife and adjustable pressure-plates coöperating with the pith-removing wheels, substantially as described.

14. The combination of feed-rolls, a splitting-knife in rear of said rolls, guide-plates leading from said knife and adapted to receive the respective split halves of the stalks, pith-removing wheels located at the rear ends of said plates, spring-pressed pressure-plates coöperating with the pith-removing wheels and devices for adjusting the tension of said plates, substantially as described.

15. In an apparatus substantially as described the combination with a pith-removing device of a yielding pressure device conformed to the individual stalk-sections and coöperating with the pith-removing device and adapted to hold the stalk-sections yieldingly thereto substantially as described.

16. The combination of a suitable frame, a plurality of feed-rolls mounted therein side by side and each having a grooved elastic tire or rim, whereby to feed the stalks individually to the knife and a splitting-knife in rear of said rolls, substantially as described.

17. The combination of a suitable frame, feed-rolls therein, a splitting-knife in rear of said rolls, corrugated plates leading rearwardly from said knife means for holding the stalk-sections against said plates adapted to receive and guide the split stalks and devices for removing the pith from the split stalks and yielding pressure devices coöperating with the pith-removing devices, substantially as described.

18. A machine for removing pith from stalks comprising stalk-splitting devices, individual feed and guide devices in advance of the splitting devices for directing the stalks separately thereto, pith-removing wheels in rear of the splitting devices and grooved or channeled guides for directing the split-stalk sections individually and separately to the pith-removing wheels substantially as described.

19. In a machine for removing pith from stalks the combination of means for splitting the stalk longitudinally, pith-removing wheels conformed to and fitted to operate in the hollow of the stalk-sections and means for directing the stalk-sections to said wheels substantially as described.

20. In a machine substantially as described, the combination of the splitting-knife, the diverging guide-plates leading therefrom, the pith-removing wheels located between said guide-plates, a conveyer receiving the pith from the said wheels and a plate extending between the pith-removing wheels and arranged to receive the pith removed by the upper wheel and to direct the same to the said conveyer, substantially as described.

GEORGE R. SHERWOOD.

Witnesses:
SOLON C. KEMON,
P. B. TURPIN.